(12) United States Patent
Miller et al.

(10) Patent No.: US 7,162,464 B1
(45) Date of Patent: Jan. 9, 2007

(54) DATA MINING ASSISTS IN A RELATIONAL DATABASE MANAGEMENT SYSTEM

(75) Inventors: Timothy Edward Miller, Temecula, CA (US); Brian Don Tate, Escondido, CA (US); Miriam H. Herman, San Diego, CA (US); Todd Michael Brye, San Diego, CA (US); Anthony Lowell Rollins, San Diego, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/806,743

(22) PCT Filed: Oct. 1, 1999

(86) PCT No.: PCT/US99/22995

§ 371 (c)(1),
(2), (4) Date: Apr. 2, 2001

(87) PCT Pub. No.: WO00/20997

PCT Pub. Date: Apr. 13, 2000

Related U.S. Application Data

(60) Provisional application No. 60/102,831, filed on Oct. 2, 1998.

(51) Int. Cl.
*G06F 17/00* (2006.01)
*G06N 5/02* (2006.01)

(52) U.S. Cl. .................................................. 706/50
(58) Field of Classification Search ................. 706/50; 707/4
See application file for complete search history.

(56) References Cited

U.S. PATENT DOCUMENTS

| | | | |
|---|---|---|---|
| 5,412,806 A | 5/1995 | Du et al. ................... 707/2 |
| 5,448,727 A | 9/1995 | Annevelink ................ 707/100 |
| 5,548,770 A * | 8/1996 | Bridges ..................... 707/2 |
| 5,590,322 A | 12/1996 | Harding et al. ............. 707/4 |
| 5,701,400 A | 12/1997 | Amado ...................... 706/45 |
| 5,710,915 A | 1/1998 | McElhiney .................. 707/3 |
| 5,734,887 A | 3/1998 | Kingberg et al. ........... 707/4 |
| 5,787,413 A | 7/1998 | Kauffman et al. .......... 707/2 |
| 5,787,425 A | 7/1998 | Bigus ........................ 707/6 |
| 5,799,310 A | 8/1998 | Anderson et al. ......... 707/102 |
| 5,806,066 A | 9/1998 | Golshani et al. .......... 707/100 |
| 5,895,465 A | 4/1999 | Guha ......................... 707/4 |
| 5,899,992 A * | 5/1999 | Iyer et al. ................... 707/7 |

OTHER PUBLICATIONS

SAS Institute Inc., SAS OnlineDoc®, Version 8, Cary, NC: SAS Institute Inc., (Sep. 1999).*
Sprint: A Scalable Parrallel Classifier for Data Mining, John Shafer, Rakesh Agrawal, Manish Mehta, Proceeding of the 22nd VLDB Conference Mumbai (Bombay), India, 1996.*
G. Graefe et al., "On the Efficient Gathering of Sufficient Statistics for Classification from Large SQL Databases," Microsoft Corporation, Abstract,© 1998, 5 pages.
P.S. Bradley et al., "Scaling EM (Expectation-Maximization) Clustering to Large Databases," Microsoft Corporation, Technical Report, Feb. 1999, 21 pages.

* cited by examiner

*Primary Examiner*—Anthony Knight
*Assistant Examiner*—Michael B. Holmes
(74) *Attorney, Agent, or Firm*—Gates & Cooper

(57) ABSTRACT

A method, apparatus, and article of manufacture for performing data mining applications in a relational database management system (114). Scalable Data Mining Functions (202) are performed directly against a relational database (116) by executing queries dynamically generated by an application programming interface (204) according to requested parameters.

54 Claims, 5 Drawing Sheets

DATA MINING ASSISTS IN A RELATIONAL DATABASE MANAGEMENT SYSTEM

CROSS-REFERENCE TO RELATED APPLICATIONS

This application claims the benefit under 35 U.S.C. Section 119(e) of the now abandoned and commonly-assigned U.S. provisional patent application Serial No. 60/102,831, filed Oct. 2, 1998, by Timothy E. Miller, Brian D. Tate, James D. Hildreth, Miriam H. Herman, Todd M. Brye, and James E. Pricer, entitled Teradata Scalable Discovery, which application is incorporated by reference herein.

This application is also related to the following co-pending and commonly-assigned utility patent applications:

Application Ser. No. PCT/US99/22966, filed on Oct. 1, 1999, by Timothy E. Miller, Brian D. Taste, James D. Hildreth, Todd M. Brye, Anthony L. Rollins, James E. Pricer, and Tej Anand, entitled SQL-Based Analytic Algorithms, Application Ser. No. 09/410,528, filed on Oct. 1, 1999, by Brian D. Tate, James E. Pricer; Tej Anand, and Randy G. Kerber, entitled SQL-Based Analytic Algorithm for Association, Application Ser. No. 09/410,531, filed on Oct. 1, 1999, by James D. Hildreth, entitled SQL-Based Analytic Algorithm for Clustering, Application Ser. No. 09/410,530, filed on Oct. 1 1999, by Todd M. Brye, entitled SQL-Based Analytic Algorithm for Rule Induction, Application Serial No. 09/411,818, filed on Oct. 1, 1999, by Brian D. Tate, entitled SQL-Based Automated Histogram Bin Data Derivation Assist, Application Ser. No. 09/410,534, filed on Oct. 1, 1999, by Brian D. Tate, entitled SQL-Based Automated, Adaptive, Histogram Bin Data Description Assist, Application Ser. No. 09/41809, filed on Oct. 1, 1999, by Todd M. Brye, Brian D. Tate, and Anthony L. Rollins, entitled SQL-Based Data Reduction Techniques for Delivering Data to Analytic Tools, Application Serial No. PCT/US99/23031, filed on Oct. 1, 1999 by Timothy E. Miller, Miriam H. Herman, and Anthony L. Rollins, entitled Techniques for Deploying Analytic Models in Parallel, Application Ser. No. PCT/US99/23019, filed on Oct. 1, 1999, by Timothy E. Miller, Brian D. Tate, and Anthony L. Rollins, entitled Analytic Logical Data Model,

BACKGROUND OF THE INVENTION

1. Field of the Invention

This invention relates in general to a relational database management system, and in particular, to data mining assists in a relational database management system.

2. Description of Related Art

Relational databases are the predominate form of database management systems used in computer systems. Relational database management systems are often used in so-called "data warehouse" applications where enormous amounts of data are stored and processed. In recent years, several trends have converged to create a new class of data warehousing applications known as data mining applications. Data mining is the process of identifying and interpreting patterns in databases, and can be generalized into three stages.

Stage one is the reporting stage, which analyzes the data to determine what happened. Generally, most data warehouse implementations start with a focused application in a specific functional area of the business. These applications usually focus on reporting historical snap shots of business information that was previously difficult or impossible to access. Examples include Sales Revenue Reporting, Production Reporting and Inventory Reporting to name a few.

Stage two is the analyzing stage, which analyzes the data to determine why it happened. As stage one end-users gain previously unseen views of their business, they quickly seek to understand why certain events occurred; for example a decline in sales revenue. After discovering a reported decline in sales, data warehouse users will then obviously ask, "Why did sales go down?" Learning the answer to this question typically involves probing the database through an iterative series of ad hoc or multidimensional queries until the root cause of the condition is discovered. Examples include Sales Analysis, Inventory Analysis or Production Analysis.

Stage three is the predicting stage, which tries to determine what will happen. As stage two users become more sophisticated, they begin to extend their analysis to include prediction of unknown events. For example, "Which end-users are likely to buy a particular product", or "Who is at risk of leaving for the competition?" It is difficult for humans to see or interpret subtle relationships in data, hence as data warehouse users evolve to sophisticated predictive analysis they soon reach the limits of traditional query and reporting tools. Data mining helps end-users break through these limitations by leveraging intelligent software tools to shift some of the analysis burden from the human to the machine, enabling the discovery of relationships that were previously unknown.

Many data mining technologies are available, from single algorithm solutions to complete tool suites. Most of these technologies, however, are used in a desktop environment where little data is captured and maintained. Therefore, most data mining tools are used to analyze small data samples, which were gathered from various sources into proprietary data structures or flat files. On the other hand, organizations are beginning to amass very large databases and end-users are asking more complex questions requiring access to these large databases.

Unfortunately, most data mining technologies cannot be used with large volumes of data. Further, most analytical techniques used in data mining are algorithmic-based rather than data-driven, and as such, there are currently little synergy between data mining and data warehouses. Moreover, from a usability perspective, traditional data mining techniques are too complex for use by database administrators and application programmers.

Thus, there is a need to scale data mining applications to large databases. In addition, there is a need in the art for improved techniques of data extraction from large databases for the purposes of data mining. Moreover, there is a need in the art for improved interfaces between large databases and data mining applications.

SUMMARY OF THE INVENTION

To overcome the limitations in the prior art described above, and to overcome other limitations that will become apparent upon reading and understanding the present specification, the present invention discloses a method, apparatus, and article of manufacture for performing data mining applications in a massively parallel relational database management system (RDBMS). Specifically, the present invention includes a comprehensive set of parameterized analytic capabilities for performing data mining operations directly within the RDBMS.

An object of the present invention is to provide more efficient usage of parallel processor computer systems. An object of the present invention is to provide a foundation for data mining tool sets in relational database management systems. Further, an object of the present invention is to allow data mining of large databases.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention provides a relational database management system (RDBMS) that supports data mining operations of relational databases. In essence, advanced analytic processing capabilities for data mining applications are placed where they belong, i.e., close to the data. Moreover, the results of these analytic processing capabilities can be made to persist within the database or can be exported from the database. These analytic processing capabilities and their results are exposed externally to the RDBMS by an application programmable interface (API).

According to the preferred embodiment, the data mining process is an iterative approach referred to as a "Knowledge Discovery Analytic Process" (KDAP). There are six major tasks within the KDAP:

1. Understanding the business objective.
2. Understanding the source data available.
3. Selecting the data set and "pre-processing" the data.
4. Designing the analytic model.
5. Creating and testing the models.
6. Deploying the analytic models.

The present invention provides various components for addressing these tasks:

An RDBMS that executes Structured Query Language (SQL) statements against a relational database.

An analytic Application Programming Interface (API) that creates scalable data mining functions comprised of complex SQL statements.

Application programs that instantiate and parameterize the analytic API.

Analytic algorithms utilizing:
  Extended ANSI SQL statements,
  a Call Level Interface (CLI) comprised of SQL staterments and programmatic iteration, and
  a Data Reduction Utility Program comprised of SQL statements and programmatic iteration.

An analytical logical data model (LDM) that stores results from and information about the advanced analytic processing in the RDBMS.

A parallel deployer that controls parallel execution of the results of the analytic algorithms that are stored in the analytic logical data model.

The benefits of the present invention include:

Data mining of very large databases directly within a relational database.

Management of analytic results within a relational database.

A comprehensive set of analytic operations that operate within a relational database management system.

Application integration through an object-oriented API.

These components and benefits are described in more detail below.

Hardware Environment

Figure 1:
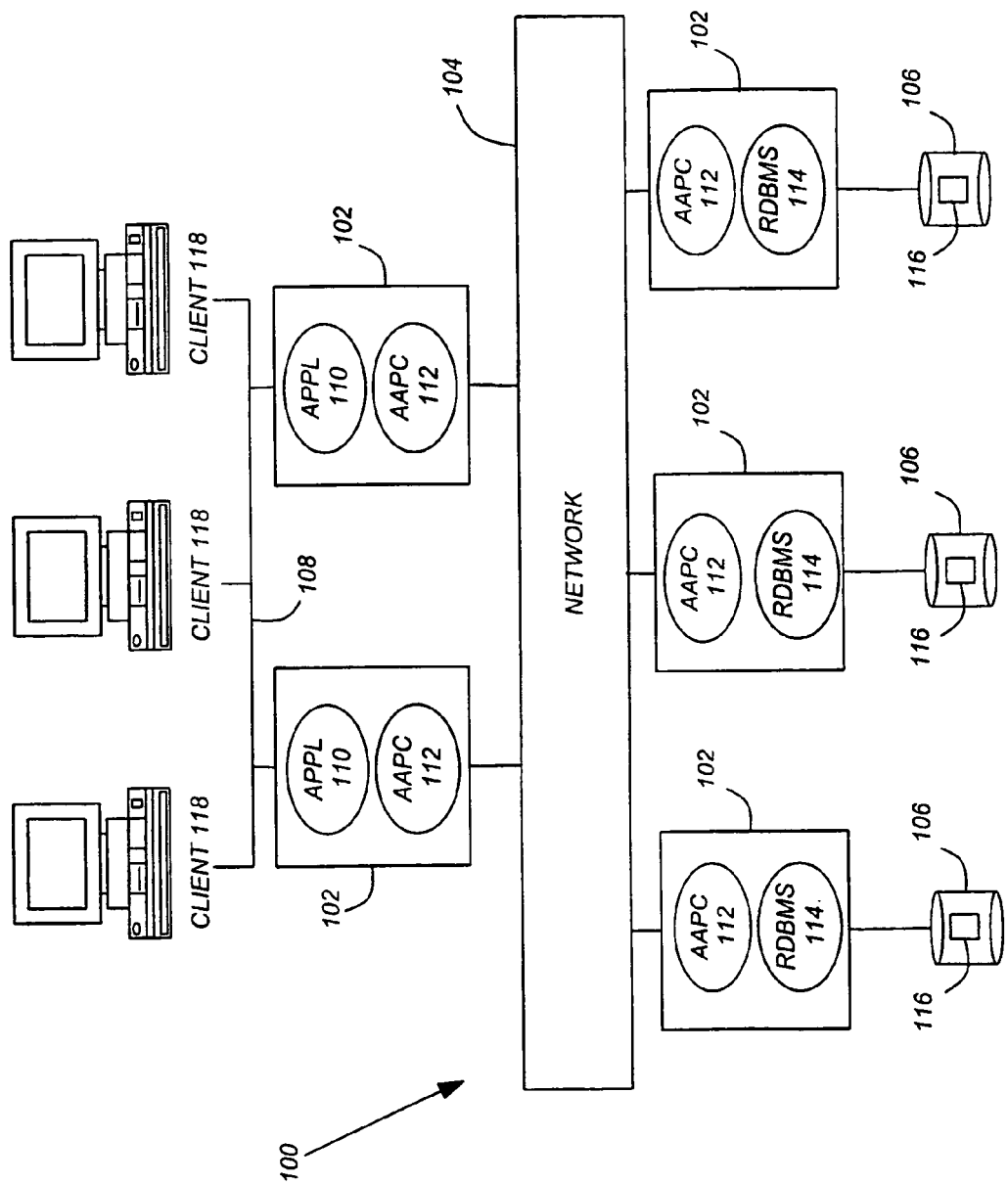
FIG. 1 is a block diagram that illustrates an exemplary computer hardware environment that could be used with the preferred embodiment of the present invention.

FIG. 1 is a block diagram that illustrates an exemplary computer hardware environment that could be used with the preferred embodiment of the present invention. In the exemplary computer hardware environment, a massively parallel processing (MPP) computer system 100 is comprised of one or more processors or nodes 102 interconnected by a network 104. Each of the nodes 102 is comprised of one or more processors, random access memory (RAM), read-only memory (ROM), and other components. It is envisioned that attached to the nodes 102 may be one or more fixed and/or removable data storage units (DSUs) 106 and one or more data communications units (DCUs) 108, as is well known in the art.

Each of the nodes 102 executes one or more computer programs, such as a Data Mining Application (APPL) 110 performing data mining operations, Advanced Analytic Processing Components (AAPC) 112 for providing advanced analytic processing capabilities for the data mining operations, and/or a Relational Database Management System (RDBMS) 114 for managing a relational database 116 stored on one or more of the DSUs 106 for use in the data mining applications, wherein various operations are performed in the APPL 110, AAPC 112, and/or RDBMS 114 in response to commands from one or more Clients 118. In alternative embodiments, the APPL 110 may be executed in one or more of the Clients 118, or on an application server on a different platform attached to the network 104.

Generally, the computer programs are tangibly embodied in and/or retrieved from RAM, ROM, one or more of the DSUs 106, and/or a remote device coupled to the computer system 100 via one or more of the DCUs 108. The computer programs comprise instructions which, when read and executed by a node 102, causes the node 102 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention. In addition, it should be understood that the present invention may also apply to other computer programs than those disclosed herein.

Logical Architecture

Figure 2:
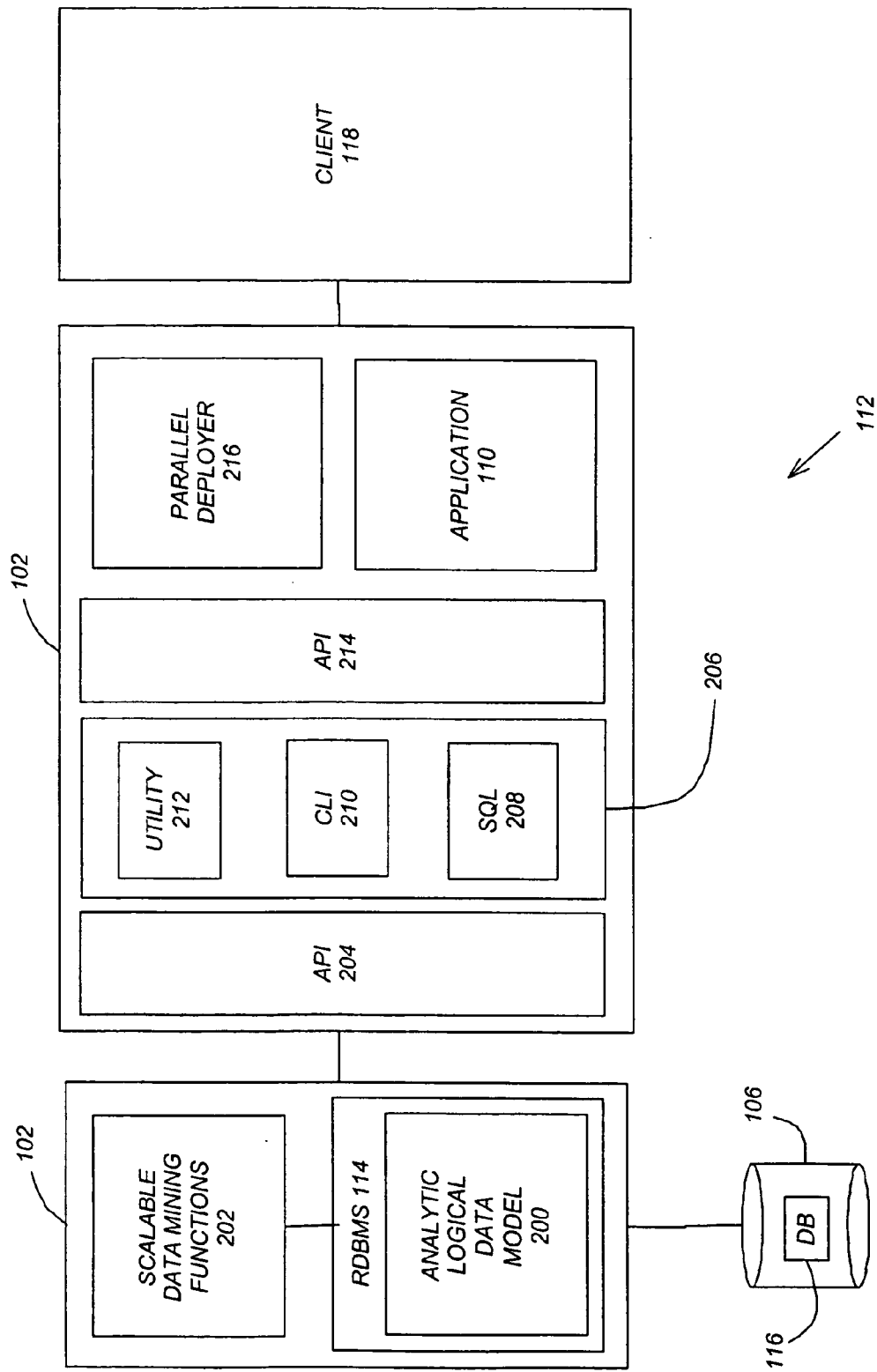
FIG. 2 is a block diagram that illustrates an exemplary logical architecture that could be used with the preferred embodiment of the present invention.

FIG. 2 is a block diagram that illustrates an exemplary logical architecture of the AAPC 112, and its interaction with the APPL 110, RDBMS 114, relational database 116, and Client 118, according to the preferred embodiment of the present invention. In the preferred embodiment, the AAPC 112 includes the following components:

- An Analytic Logical Data Model (LDM) 200 that stores results from the advanced analytic processing in the RDBMS 114,
- One or more Scalable Data Mining Functions 202 that comprise complex, optimized SQL statements that perform advanced analytic processing in the RDBMS 114,
- An Analytic Application Programming Interface (API) 204 that provides a mechanism for an APPL 110 or other component to invoke the Scalable Data Mining Functions 202,
- One or more Analytic Algorithms 206 that can operate as standalone applications or can be invoked by another component, wherein the Analytic Algorithms 206 comprise:
  - Extended ANSI SQL 208 that can be used to implement a certain class of Analytic Algorithms 206,
  - A Call Level Interface (CLI) 210 that can be used when a combination of SQL and programmatic iteration is required to implement a certain class of Analytic Algorithms 206, and
  - A Data Reduction Utility Program 212 that can be used to implement a certain class of Analytic Algorithms 206 where data is first reduced using SQL followed by programmatic iteration.
- An Analytic Algorithm Application Programming Interface (API) 214 that provides a mechanism for an APPL 110 or other components to invoke the Analytic Algorithms 206,
- A Parallel Deployer 216 that controls parallel executions of the results of an Analytic Algorithm 206 (sometimes referred to as an analytic model) that are stored in the Analytic LDM 200, wherein the results of executing the Parallel Deployer 216 are stored in the RDBMS 114.

Note that the use of these various components is optional, and thus only some of the components may be used in any particular configuration.

The preferred embodiment is oriented towards a multi-tier logical architecture, in which a Client 118 interacts with the various components described above, which, in turn, interface to the RDBMS 114 to utilize a large central repository of enterprise data stored in the relational database 116 for analytic processing.

In one example, a Client 118 interacts with an APPL 110, which interfaces to the Analytic API 204 to invoke one or more of the Scalable Data Mining Functions 202, which are executed by the RDBMS 114. The results from the execution of the Scalable Data Mining Functions 202 would be stored in an Analytic LDM 200 in the RDBMS 114.

In another example, a Client 118 interacts with one or more Analytic Algorithms 206 either directly or via the Analytic Algorithm API 214. The Analytic Algorithms 206 comprise SQL statements that may or may not include programmatic iteration, and the SQL statements are executed by the RDBMS 114. In addition, the Analytic Algorithms 206 may or may not interface to the Analytic API 204 to invoke one or more of the Scalable Data Mining Functions 202, which are executed by the RDBMS 114. Regardless, the results from the execution of the Analytic Algorithms 206 would be stored in an Analytic LDM 200 in the RDBMS 114.

In yet another example, a Client 118 interacts with the Parallel Deployer 216, which invokes parallel instances of the results of the Analytic Algorithms 206, sometimes referred to as an Analytic Model. The Analytic Model is stored in the Analytic LDM 200 as a result of executing an instance of the Analytic Algorithms 206. The results of executing the Parallel Deployer 216 are stored in the RDBMS 114.

In still another example, a Client 118 interacts with the APPL 110, which invokes one or more Analytic Algorithms 206 either directly or via the Analytic Algorithm API 214. The results would be stored in an Analytic LDM 200 in the RDBMS 114.

The overall goal is to significantly improve the performance, efficiency, and scalability of data mining operations by performing compute and/or I/O intensive operations in the various components. The preferred embodiment achieves this not only through the parallelism provided by the MPP computer system 100, but also from reducing the amount of data that flows between the APPL 110, AAPC 112, RDBMS 114, Client 118, and other components.

Those skilled in the art will recognize that the exemplary configurations illustrated and discussed in conjunction with FIG. 2 are not intended to limit the present invention. Indeed, those skilled in the art will recognize that other alternative configurations may be used without departing from the scope of the present invention. In addition, it should be understood that the present invention may also apply to other components than those disclosed herein.

Scalable Data Mining Functions

The Scalable Data Mining Functions 202 are created, in the preferred embodiment, by parameterizing and instantiating the corresponding Analytic APIs 204. The Scalable Data Mining Functions 202 comprise complex, optimized queries in the form of Structured Query Language (SQL), which is a standard language for the RDBMS 114. The Scalable Data Mining Functions 202 perform much of the analytic processing for data mining applications, without having to move data from the relational database 116.

The Scalable Data Mining Functions 202 can be categorized by the following functions:

- Data Description: The ability to understand and describe the available data using statistical techniques. For example, the generation of descriptive statistics, frequencies and/or histogram bins.
- Data Derivation: The ability to generate new variables (transformations) based upon existing detailed data when designing an analytic model. For example, the generation of predictive variables such as bitmaps, ranges, codes and mathematical functions.
- Data Reduction: The ability to reduce the number of variables (columns) or observations (rows) used when designing an analytic model. For example, creating Covariance, Correlation, or Sum of Squares and Cross-Products (SSCP) Matrices.
- Data Reorganization: The ability to join or denormalize pre-processed results into a wide analytic data set.
- Data Sampling/Partitioning: The ability to intelligently request different data samples or data partitions. For example, hash data partitioning or data sampling.

The principal theme of the Scalable Data Mining Functions 202 is to facilitate analytic operations within the RDBMS 114, which process data collections stored in the database 116 and produce results that also are stored in the database 116. Since data mining operations tend to be iterative and exploratory, the database 116 in the preferred embodiment comprises a combined storage and work space environment. As such, a sequence of data mining operations is viewed as a set of steps that start with some collection of tables in the database 116, generate a series of intermediate work tables, and finally produce a result table or view.

Data Description

This category of functions provides a variety of descriptive statistical functions, giving the analyst an intimate knowledge of the data to be mined. Such descriptive statistical analysis is valuable for several reasons. First, it can provide business insight in its own right. Second, it uncovers data quality issues, which, if not corrected or compensated for, would jeopardize the accuracy of any analytic models that are based on the data. Next, it isolates the data that should be used in building analytic models. Further, some statistical processes used in analytic modeling require a certain type of distribution of data. Descriptive statistical analysis can determine the suitability of various data elements for model input and can suggest which transformations may be required for these data elements.

The Data Description components are shown in the following Table:

| Function | Description |
| --- | --- |
| STATS | Descriptive statistics for numeric column(s), including Count, Minimum, Maximum, Mean, Standard Deviation, Standard Mean Error, Variance, Coefficient of Variance, Skewness, Kurtosis, Uncorrected Sum of Squares, Corrected Sum of Squares, and Quantiles |
| VALUES | Count the number of values of various kinds for a given column |
| MODES | Calculate modality, the most frequently occurring value(s) for a column |
| BIN | Bin numeric column(s) giving counts with overlay and statistics options |
| BINPLUS | Automatically sub-bin numeric column(s) giving additional counts and isolate frequently occurring individual values. |
| FREQ | Compute frequency of column values or multi-column combined values |
| FREQWEB | Compute frequency of values for pairs of columns in column list |
| COR | Create a Pearson Product-Moment Correlation matrix |
| COV | Create a Covariance matrix |
| SSCP | Create a sum of squares and cross-products matrix |
| OVERLAP | Count overlapping column values in combinations of tables |

Data Derivation

This category of functions provides a variety of column derivations or transformations that are useful prior to designing the analytic model. Sometimes these derivations are required by the analytical modeling method to be used (for example, some methods may require categorical input, while other methods may require numeric input). Even when these derivations are not required by the analytical modeling method, the results of analytical modeling are greatly affected by the measures that can be derived to characterize some type of behavior or quality. This is one of the areas of data mining requiring the most trial and error, and reliance on past experience. Substantial timesaving can be gained by automating the derivation process, and insights from past experiences can be reused by saving and reapplying prior derivation techniques.

The Data Derivation functions are shown in the following Table:

| Function | Description |
| --- | --- |
| BINCODE | Derive binned numeric column - new column is bin number |
| DUMMYCODE | Dummy-code n-valued categorical column into 'n' 0/1 values |
| RECODE | Re-code n-valued categorical column into n or less new values |
| RESCALE | Scale numeric column(s) via range transformation |
| ZSCORE | Scale column(s) to Z-Score - the number of standard deviations from the mean |
| SIGMOID | Scale numeric column(s) via Sigmoidal transformation function |
| LOG | Scale numeric column(s) via base 10 logarithm function |
| LN | Scale numeric column(s) via natural logarithm function |
| EXP | Scale numeric column(s) via exponential function (e** column value) |
| POWER | Scale numeric column(s) by raising to some power |
| DERIVE | Derive numeric column(s) via user defined transformation function |
| RANK | Derive new column(s) by ranking column(s) or expression(s) based on order |
| QUANTILE | Derive new column(s) with Quantile 0 to n-1 based on order and n |
| CSUM | Derive cumulative sum of value expression based on sort expression |
| MAVG | Derive moving average of value expression based on width and order |
| MSUM | Derive moving sum of value expression based on width and order |
| MDIFF | Derive moving difference of value expression based on width and order |
| MLINREG | Derive moving linear regression value from expression, width, and order |
| BMAP | Multiple account/product ownership bitmap |
| BMAPTIME | Product ownership bitmap over multiple time periods |
| TRANINT | Derive counts, amount, percentage means and intensities from transaction summary |
| TRANVAR | Derive variabilities from transaction summary data |
| TRIG | Derive trigonometric values and their inverses, including sin, arcsin, cos, arccos, csc, arccsc, sec, arcsec, tan, arctan, cot, and arccot |
| HYPER | Derive hyperbolic values and their inverses, including sinh, arcsinh, cosh, arccosh, csch, arccsch, sech, arcsech, tanh, arctanh, coth, and arccoth |

Data Reduction

This category of functions provides utility-based matrix building operations to reduce the amount of data required for analytic algorithms. Numeric columns in potentially huge relational tables are reduced to a comparatively compact matrix (n-by-n if there are n-columns), which is delivered to the APPL 110, Client 118, or some other program for further analysis.

The Data Reduction functions are shown in the following Table:

| Function | Description |
|---|---|
| BLDMAT | Build one of three data reduction matrices, including: (1) Pearson-Product Moment Correlations; (2) Covariances; and (3) Sum of Squares and Cross Products (SSCP) |
| GETMAT | Export the resultant matrix and build either a flat file or a program to deliver the data to an outside application. |
| RSTMAT | Restart the BLDMAT process upon a failure. |

Data Reorganization

The functions in this category provide the ability to reorganize data by joining and/or denormalizing pre-processed results into a wide analytic data set. The result of these functions is a newly restructured table that has been constructed from one or more existing tables.

The Data Reorganization functions are shown in the following Table:

| Function | Description |
|---|---|
| Denormalize | Create new table denormalizing by removing key column(s) |
| Join | Join tables or views into combined result table |

Data Sampling/Partitioning

The functions in this category provide the ability to construct a new table containing a randomly selected subset of the rows in an existing table or view. Although the preferred embodiment provides the option of performing analytic operations on the entire data set, sampling is often necessary to create multiple data sets used for training, testing, and validation. Sampling can also be useful during simple trial periods when it would otherwise be unwieldy to perform an analytic process because of the volume of data available. This is especially true for compute intensive analytic modeling tasks, such as neural network modeling. However, analytic tasks, which can be classified as descriptive in nature, are ideally performed prior to sampling, and may in fact suggest data constraints that should be used before sampling.

Partitioning is similar to sampling but allows mutually distinct but all-inclusive subsets of data to be requested by separate processes. For example, a table can be partitioned into three distinct pieces.

The Data Sampling/Partitioning functions are shown in the following Table:

| Function | Description |
|---|---|
| Partition | Select a data partition, or multiple data partitions from a table using a database internal hashing technique. |
| Sample | Select a data sample, or multiple data samples of a specified size (or sizes) from a table. |

Those skilled in the art will recognize that the functions listed for each of the above-identified categories are merely exemplary and thus are not intended to be exhaustive of the category. Indeed, any number of different functions could be added to a category without departing from the scope of this invention.

Analytic Algorithms

The Analytic Algorithms 206 provide statistical and "machine learning" methods to create Analytic LDMs 200 from the data residing in the relational database 116. Analytic Algorithms 206 that are completely data driven, such as association, can be implemented solely in Extended ANSI SQL 208. Analytic Algorithms 206 that require a combination of SQL and programmatic iteration, such as induction, can be implemented using the CLI 210. Finally, Analytic Algorithms 206 that require almost complete programmatic iteration, such as clustering, can be implemented using a Data Reduction Utility Program 212, wherein this approach involves data pre-processing that reduces the amount of data that a non-SQL algorithm can then process.

The Analytic Algorithms 206 significantly improve the performance and efficiency of data mining operations by providing the technology components to perform advanced analytic operations directly against the RDBMS 114. In addition, the Analytic Algorithms 206 leverage the parallelism that exists in the MPP computer system 100, the RDBMS 114, and the database 116.

The Analytic Algorithms 206 provide data analysts with an unprecedented option to train and apply "machine learning" analytics against massive amounts of data in the relational database 116. Prior techniques have failed as their sequential design is not optimal in an RDBMS 114 environment. Because the Analytic Algorithms 206 are implemented in Extended ANSI SQL 208, through the CLI 210, and/or by means of the Data Reduction Utility Program 212, they can therefore leverage the scalability available on the MPP computer system 100. In addition, taking a data-driven approach to analysis, through the use of complete Extended ANSI SQL 208, allows people other than highly educated statisticians to leverage the advanced analytic techniques offered by the Analytic Algorithms 206.

Analytic Logical Data Model

The Analytic LDM 200, which is integrated with the relational database 116 and the RDBMS 114, provides logical entity and attribute definitions for advanced analytic processing, i.e., the Scalable Data Mining Functions 202 and Analytic Algorithms 206, performed by the RDBMS 114 directly against the relational database 116. These logical entity and attribute definitions comprise metadata that define the characteristics of data stored in the relational database 116, as well as metadata that determines how the RDBMS 114 performs the advanced analytic processing. The Analytic LDM 200 also stores processing results from this advanced analytic processing, which includes both result tables and derived data for the Scalable Data Mining Functions 202, Analytic Algorithms 206, and the Parallel Deployer 216. The Analytic LDM 200 is a dynamic model, since the logical entities and attributes definitions change depending upon parameterization of the advanced analytic processing, and since the Analytic LDM 200 is updated with the results of the advanced analytic processing.

Logic of the Preferred Embodiment

Figure 3:
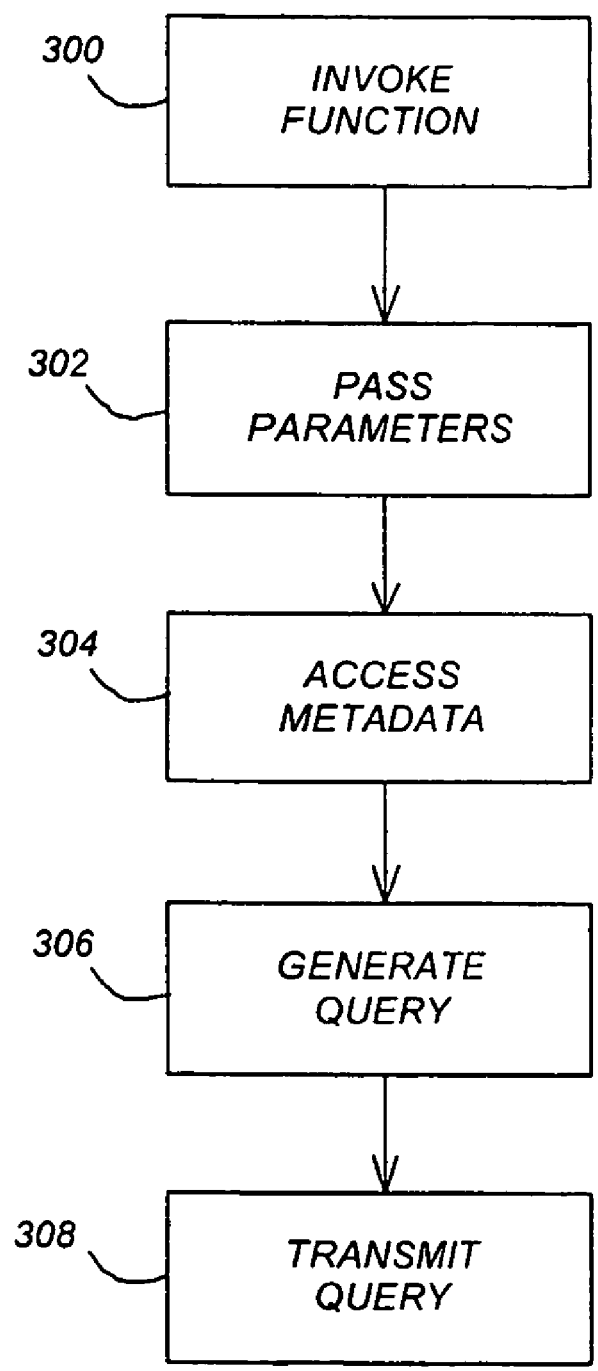
FIGS. 3, 4 and 5 are flowcharts that illustrate exemplary logic performed according to the preferred embodiment of the present invention.
Figure 4:
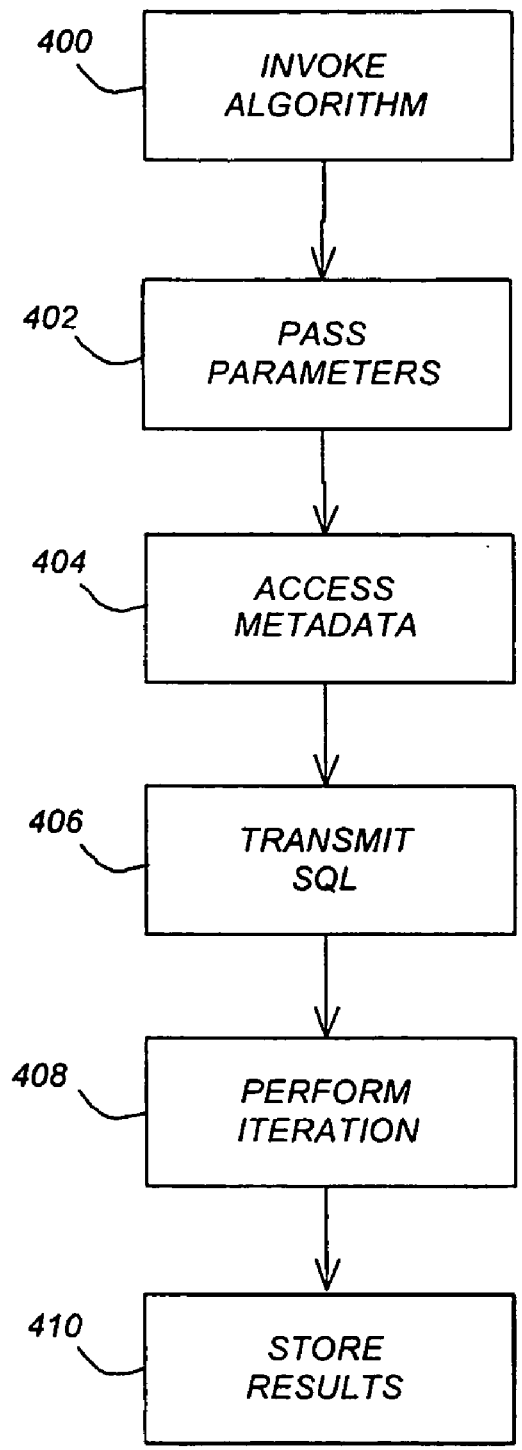
Figure 5:
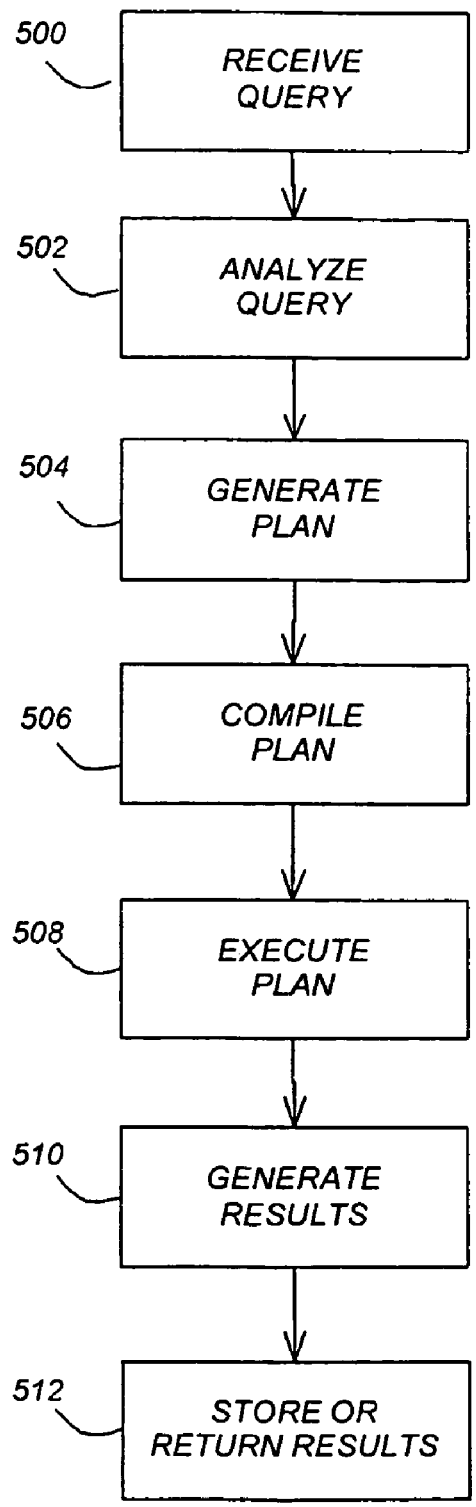

Flowcharts which illustrate the logic of the preferred embodiment of the present invention are provided in FIGS. 3, 4 and 5. Those skilled in the art will recognize that this logic is provided for illustrative purposes only and that different logic may be used to accomplish the same results.

Referring to FIG. 3, this flowchart illustrates the logic of the Scalable Data Mining Functions 202 according to the preferred embodiment of the present invention.

Block 300 represents the one or more of the Scalable Data Mining Functions 202 being created via the API 204. This may entail, for example, the instantiation of an object providing the desired function.

Block 302 represents certain parameters being passed to the API 204, in order to control the operation of the Scalable Data Mining Functions 202.

Block 304 represents the metadata in the Analytic LDM 200 being accessed, if necessary for the operation of the Scalable Data Mining Function 202.

Block 306 represents the API 204 generating a Scalable Data Mining Function 204 in the form of a data mining query based on the passed parameters and optional metadata.

Block 308 represents the Scalable Data Mining Function 204 being passed to the RDBMS 114 for execution.

Referring to FIG. 4, this flowchart illustrates the logic of the Analytic Algorithms 206 according to the preferred embodiment of the present invention.

Block 400 represents the Analytic Algorithms 206 being invoked, either directly or via the Analytic Algorithm API 214.

Block 402 represents certain parameters being passed to the Analytic Algorithms 206, in order to control their operation.

Block 404 represents the metadata in the Analytic LDM 200 being accessed, if necessary for the operation of the Analytic Algorithms 206.

Block 406 represents the Analytic Algorithms 206 passing SQL statements to the RDBMS 114 for execution and Block 408 optionally represents the Analytic Algorithms 206 performing programmatic iteration. Those skilled in the art will recognize that the sequence of these steps may differ from those described above, may not include both steps, may include additional steps, and may include iterations of these steps.

Block 410 represents the Analytic Algorithms 206 storing results in the Analytic LDM 200.

Referring to FIG. 5, this flowchart illustrates the logic performed by the RDBMS 114 according to the preferred embodiment of the present invention.

Block 500 represents the RDBMS 114 receiving a query or other SQL statements.

Block 502 represents the RDBMS 114 analyzing the query.

Block 504 represents the RDBMS 114 generating a plan that enables the RDBMS 114 to retrieve the correct information from the relational database 116 to satisfy the query.

Block 506 represents the RDBMS 114 compiling the plan into object code for more efficient execution by the RDBMS 114, although it could be interpreted rather than compiled.

Block 508 represents the RDBMS 114 initiating execution of the plan.

Block 510 represents the RDBMS 114 generating results from the execution of the plan.

Block 512 represents the RDBMS 114 either storing the results in the Analytic LDM 200, or returning the results to the Analytic Algorithm 206, APPL 110, and/or Client 118.

CONCLUSION

This concludes the description of the preferred embodiment of the invention. The following describes an alternative embodiment for accomplishing the same invention. Specifically, in an alternative embodiment, any type of computer, such as a mainframe, minicomputer, or personal computer, could be used to implement the present invention.

In summary, the present invention discloses a method, apparatus, and article of manufacture for performing data mining applications in a massively parallel relational database management system. A set of scalable data mining functions can be invoked for performing data mining operations directly within a relational database management system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented system for performing data mining applications, comprising:
    (a) a computer having one or more data storage devices connected thereto, wherein a relational database is stored on one or more of the data storage devices;
    (b) a relational database management system, executed by the computer, for accessing the relational database stored on the data storage devices by executing Structured Query Language (SQL) statements;
    (c) an analytic application programming interface (API), executed by the computer, for generating one or more scalable data mining functions comprised of SQL statements for execution by the relational database management system, wherein the scalable data mining functions identify and interpret patterns in the relational database; and
    (d) one or more analytic algorithms, executed by the computer, for interfacing to the analytic API to generate the scalable data mining functions, wherein the scalable data mining functions process data collections stored in the relational database and produce results that are stored in the relational database.

2. The system of claim 1 above, wherein the computer comprises a parallel processing computer comprised of a plurality of nodes, and each node executes one or more threads of the relational database management system to provide parallelism in the data mining operations.

3. The system of claim 1, wherein the scalable data mining functions are created by parameterizing and instantiating the analytic API.

4. The system of claim 1, wherein the scalable data mining functions are dynamically generated SQL statements comprised of combined phrases with substituting values therein based on parameters supplied to the analytic API.

5. The system of claim 1, wherein the scalable data mining functions comprise Data Description functions that provide descriptive statistical functions.

6. The system of claim 5, wherein the Data Description functions comprise:
    (1) descriptive statistics for one or more numeric columns, wherein the statistics are selected from a group comprising count, minimum, maximum, mean, standard deviation, standard mean error, variance, coefficient of variance, skewness, kurtosis, uncorrected sum of squares, corrected sum of squares, and quantiles,
    (2) a count of values for a column,
    (3) a calculated modality for a column, (4) one or more bin numeric columns of counts with overlay and statistics options,
(5) one or more automatically sub-binned numeric columns giving additional counts and isolated frequently occurring individual values
(6) a computed frequency of one or more column values,
(7) a computed frequency of values for pairs of columns in a column list,
(8) a Pearson Product-Moment Correlation matrix,
(9) a Covariance matrix,
(10) a sum of squares and cross-products matrix, or
(11) a count of overlapping column values in one or more combinations of tables.

7. The system of claim 1, wherein the scalable data mining functions comprise Data Derivation functions that provide column derivations or transformations.

8. The system of claim 7, wherein the Data Derivation functions comprise:
(1) a derived binned numeric column wherein a new column is bin number,
(2) a n-valued categorical column dummy-coded into "n" 0/1 values,
(3) a n-valued categorical column recoded into n or less new values,
(4) one or more numeric columns scaled via range transformation,
(5) one or more columns scaled to a z-score that is a number of standard deviations from a mean,
(6) one or more numeric columns scaled via a sigmoidal transformation function,
(7) one or more numeric columns scaled via a base 10 logarithm function,
(8) one or more numeric columns scaled via a natural logarithm function,
(9) one or more numeric columns scaled via an exponential function,
(10) one or more numeric columns raised to a specified power,
(11) one or more numeric columns derived via user defined transformation function,
(12) one or more new columns derived by ranking one or more columns or expressions based on order,
(13) one or more new columns derived with quantile 0 to n−1 based on order and n,
(14) a cumulative sum of a value expression based on a sort expression,
(15) a moving average of a value expression based on a width and order,
(16) a moving sum of a value expression based on a width and order,
(17) a moving difference of a value expression based on a width and order,
(18) a moving linear regression value derived from an expression, width, and order,
(19) a multiple account/product ownership bitmap,
(20) a product ownership bitmap over multiple time periods,
(21) one or more counts, amount, percentage means and intensities derived from a transaction summary,
(22) one or more variabilities derived from transaction summary data,
(23) one or more derived trigonometric values and their inverses, including sin, arcsin, cos, arccos, csc, arccsc, sec, arcsec, tan, arctan, cot, and arccot, or
(24) one or more derived hyperbolic values and their inverses, including sinh arcsinh, cosh, arccosh, csch, arccsch, secth, arcsech, tanh, arctanh, coth, and arecoth.

9. The system of claim 1, wherein the scalable data mining functions comprise Data Reduction functions that provide matrix building operations to reduce the amount of data required for analytic algorithms.

10. The system of claim 9, wherein the Data Reduction functions comprise:
(1) build one or more data reduction matrices from a group comprising: (i) a Pearson-Product Moment Correlations matrix; (ii) a Covariances matrix; and (iii) a Sum of Squares and Cross Products (SSCP) matrix,
(2) export a resultant matrix, or
(3) restart a matrix operation.

11. The system of claim 1, wherein the scalable data mining functions comprise Data Reorganization functions that provide an ability to reorganize data by joining or de-normalizing pre-processed results into a wide analytic data set.

12. The system of claim 11, wherein the Data Reorganization functions comprise:
(1) create a de-normalized new table by removing one or more key columns, or
(2) join a plurality of tables or views into a combined result table.

13. The system of claim 1, wherein the scalable data mining functions comprise a Data Sampling function that provides an ability to construct a new table containing a randomly selected subset of the rows in an existing table or view.

14. The system of claim 13, wherein the Data Sampling function selects one or more data samples of specified sizes from a table.

15. The system of claim 1, wherein the scalable data mining functions comprise a Data Partitioning function that provides an ability to construct a new table containing at least one randomly selected subset of the rows in an existing table or view, wherein the subsets are mutually distinct but all-inclusive subsets of data.

16. The system of claim 15, wherein the Data Partitioning function selects one or more data partitions from a table using a database internal hashing technique.

17. The system of claim 1, wherein results of the data mining operations are stored in the relational database.

18. The system of claim 1, wherein the relational database management system further comprises an analytical logical data model that stores metadata and processing results from the Scalable Data Mining Functions.

19. A computer-implemented method for performing data mining applications, comprising:
(a) storing a relational database on one or more data storage devices connected to a computer;
(b) accessing the relational database stored on the data storage devices using a relational database management system by executing Structured Query Language (SQL) statements on the computer;
(c) executing an analytic application programming interface (API), on the computer, for generating one or more scalable data mining functions comprised of SQL statements for execution by the relational database management system, wherein the scalable data mining functions identify and interpret patterns in the relational database; and
(d) executing one or more analytic algorithms, on the computer, for interfacing to the analytic API to generate the scalable data mining functions, wherein the scalable data mining functions process data collections stored in the relational database and produce results that are stored in the relational database.

20. An article of manufacture tangibly embodying logic for performing a computer-implemented method for performing data mining applications, comprising:
 (a) storing a relational database on one or more data storage devices connected to a computer;
 (b) accessing the relational database stored on the data storage devices using a relational database management system by executing Structured Query Language (SQL) statements on the computer;
 (c) executing an analytic application programming interface (API), on the computer, for generating one or more scalable data mining functions comprised of SQL statements for execution by the relational database management system, wherein the scalable data mining functions identify and interpret patterns in the relational database; and
 (d) executing one or more analytic algorithms, on the computer, for interfacing to the analytic API to generate the scalable data mining functions, wherein the scalable data mining functions process data collections stored in the relational database and produce results that are stored in the relational database.

21. The method of claim 19 above, wherein the computer comprises a parallel processing computer comprised of a plurality of nodes, and each node executes one or more threads of the relational database management system to provide parallelism in the data mining operations.

22. The method of claim 19, wherein the scalable data mining functions are created by parameterizing and instantiating the analytic API.

23. The method of claim 19, wherein the scalable data mining functions are dynamically generated SQL statements comprised of combined phrases with substituting values therein based on parameters supplied to the analytic API.

24. The method of claim 19, wherein the scalable data mining functions comprise Data Description functions that provide descriptive statistical functions.

25. The method of claim 24, wherein the Data Description functions comprise:
 (1) descriptive statistics for one or more numeric columns, wherein the statistics are selected from a group comprising count, minimum, maximum, mean, standard deviation, standard mean error, variance, coefficient of variance, skewness, kurtosis, uncorrected sum of squares, corrected sum of squares, and quantiles,
 (2) a count of values for a column,
 (3) a calculated modality for a column,
 (4) one or more bin numeric columns of counts with overlay and statistics options,
 (5) one or more automatically sub-binned numeric columns giving additional counts and isolated frequently occurring individual values
 (6) a computed frequency of one or more column values,
 (7) a computed frequency of values for pairs of columns in a column list,
 (8) a Pearson Product-Moment Correlation matrix,
 (9) a Covariance matrix,
 (10) a sum of squares and cross-products matrix, or
 (11) a count of overlapping column values in one or more combinations of tables.

26. The method of claim 24, wherein the scalable data mining functions comprise Data Derivation functions that provide column derivations or transformations.

27. The method of claim 26, wherein the Data Derivation functions comprise:
 (1) a derived binned numeric column wherein a new column is bin number,
 (2) a n-valued categorical column dummy-coded into "n" 0/1 values,
 (3) a n-valued categorical column recoded into n or less new values,
 (4) one or more numeric columns scaled via range transformation,
 (5) one or more columns scaled to a z-score that is a number of standard deviations from a mean,
 (6) one or more numeric columns scaled via a sigmoidal transformation function,
 (7) one or more numeric columns scaled via a base 10 logarithm function,
 (8) one or more numeric columns scaled via a natural logarithm function,
 (9) one or more numeric columns scaled via an exponential function,
 (10) one or more numeric columns raised to a specified power,
 (11) one or more numeric columns derived via user defined transformation function,
 (12) one or more new columns derived by ranking one or more columns or expressions based on order,
 (13) one or more new columns derived with quantile 0 to n−1 based on order and n,
 (14) a cumulative sum of a value expression based on a sort expression,
 (15) a moving average of a value expression based on a width and order,
 (16) a moving sum of a value expression based on a width and order,
 (17) a moving difference of a value expression based on a width and order,
 (18) a moving linear regression value derived from an expression, width, and order,
 (19) a multiple account/product ownership bitmap,
 (20) a product ownership bitmap over multiple time periods,
 (21) one or more counts, amount, percentage means and intensities derived from a transaction summary,
 (22) one or more variabilities derived from transaction summary data,
 (23) one or more derived trigonometric values and their inverses, including sin, arcsin, cos, arccos, csc, arccsc, sec, arcsec, tan, arctan, cot, and arccot, or
 (24) one or more derived hyperbolic values and their inverses, including sinh, arcsinh, cosh, arccosh, csch, arccsch, sech, arcsech, tanh, arctanh, coth, and arccoth.

28. The method of claim 19, wherein the scalable data mining functions comprise Data Reduction functions that provide matrix building operations to reduce the amount of data required for analytic algorithms.

29. The method of claim 28, wherein the Data Reduction functions comprise:
 (1) build one or more data reduction matrices from a group comprising: (i) a Pearson-Product Moment Correlations matrix; (ii) a Covariances matrix; and (iii) a Sum of Squares and Cross Products (SSCP) matrix,
 (2) export a resultant matrix, or
 (3) restart a matrix operation.

30. The method of claim 19, wherein the scalable data mining functions comprise Data Reorganization functions that provide an ability to reorganize data by joining or de-normalizing pre-processed results into a wide analytic data set.

31. The method of claim 30, wherein the Data Reorganization functions comprise:
(1) create a de-normalized new table by removing one or more key columns, or
(2) join a plurality of tables or views into a combined result table.

32. The method of claim 19, wherein the scalable data mining functions comprise a Data Sampling function that provides an ability to construct a new table containing a randomly selected subset of the rows in an existing table or view.

33. The method of claim 32, wherein the Data Sampling function selects one or more data samples of specified sizes from a table.

34. The method of claim 19, wherein the scalable data mining functions comprise a Data Partitioning function that provides an ability to construct a new table containing at least one randomly selected subset of the rows in an existing table or view, wherein the subsets are mutually distinct but all-inclusive subsets of data.

35. The method of claim 34, wherein the Data Partitioning function selects one or more data partitions from a table using a database internal hashing technique.

36. The method of claim 19, wherein results of the data mining operations are stored in the relational databases.

37. The method of claim 19, wherein the relational database management system further comprises an analytical logical data model that stores metadata and processing results from the Scalable Data Mining Functions.

38. The article of claim 20 above, wherein the computer comprises a parallel processing computer comprised of a plurality of nodes, and each node executes one or more threads of the relational database management system to provide parallelism in the data mining operations.

39. The article of claim 20, wherein the scalable data mining functions are created by parameterizing and instantiating the analytic API.

40. The article of claim 20, wherein the scalable data mining functions are dynamically generated SQL statements comprised of combined phrases with substituting values therein based on parameters supplied to the analytic API.

41. The article of claim 20, wherein the scalable data mining functions comprise Data Description functions that comprise descriptive statistical functions.

42. The article of claim 41, wherein the Data Description functions comprise:
(1) descriptive statistics for one or more numeric columns, wherein the statistics are selected from a group comprising count, minimum, maximum, mean, standard deviation, standard mean error, variance, coefficient of variance, skewness, kurtosis, uncorrected sum of squares, corrected sum of squares, and quantiles,
(2) a count of values for a column,
(3) a calculated modality for a column,
(4) one or more bin numeric columns of counts with overlay and statistics options,
(5) one or more automatically sub-binned numeric columns giving additional counts and isolated frequently occurring individual values
(6) a computed frequency of one or more column values,
(7) a computed frequency of values for pairs of columns in a column list,
(8) a Pearson Product-Moment Correlation matrix,
(9) a Covariance matrix,
(10) a sum of squares and cross-products matrix, or
(11) a count of overlapping column values in one or more combinations of tables.

43. The article of claim 20, wherein the scalable data mining functions comprise Data Derivation functions that provide column derivations or transformations.

44. The article of claim 43, wherein the Data Derivation functions comprise:
(1) a derived binned numeric column wherein a new column is bin number,
(2) a n-valued categorical column dummy-coded into "n" 0/1 values,
(3) a n-valued categorical column recoded into n or less new values,
(4) one or more numeric columns scaled via range transformation,
(5) one or more columns scaled to a z-score that is a number of standard deviations from a mean,
(6) one or more numeric columns scaled via a sigmoidal transformation function,
(7) one or more numeric columns scaled via a base 10 logarithm function,
(8) one or more numeric columns scaled via a natural logarithm function,
(9) one or more numeric columns scaled via an exponential function,
(10) one or more numeric columns raised to a specified power,
(11) one or more numeric columns derived via user defined transformation function,
(12) one or more new columns derived by ranking one or more columns or expressions based on order,
(13) one or more new columns derived with quantile 0 to n−1 based on order and n,
(14) a cumulative sum of a value expression based on a sort expression,
(15) a moving average of a value expression based on a width and order,
(16) a moving sum of a value expression based on a width and order,
(17) a moving difference of a value expression based on a width and order,
(18) a moving linear regression value derived from an expression, width, and order,
(19) a multiple account/product ownership bitmap,
(20) a product ownership bitmap over multiple time periods,
(21) one or more counts, amount, percentage means and intensities derived from a transaction summary,
(22) one or more variabilities derived from transaction summary data,
(23) one or more derived trigonometric values and their inverses, including sin, arcsin, cos, arccos, csc, arccsc, sec, arcsec, tan, arctan, cot, and arccot, or
(24) one or more derived hyperbolic values and their inverses, including sin, arcsinh, cosh, arccosh, csch, arccsch, sech, arcsech, tanh, arctanh, coth, and arccoth.

45. The article of claim 20, wherein the scalable data mining functions comprise Data Reduction functions that provide matrix building operations to reduce the amount of data required for analytic algorithms.

46. The article of claim 45, wherein the Data Reduction functions comprise:
(1) build one or more data reduction matrices from a group comprising: (i) a Pearson-Product Moment Correlations matrix; (ii) a Covariances matrix; and (iii) a Sum of Squares and Cross Products (SSCP) matrix,
(2) export a resultant matrix, and or
(3) restart a matrix operation.

47. The article of claim 20, wherein the scalable data mining functions comprise Data Reorganization functions that provide an ability to reorganize data by joining or de-normalizing pre-processed results into a wide analytic data set.

48. The article of claim 47, wherein the Data Reorganization functions comprise:
   (1) create a de-normalized new table by removing one or more key columns, or
   (2) join a plurality of tables or views into a combined result table.

49. The article of claim 20, wherein the scalable data mining functions comprise a Data Sampling function that provides an ability to construct a new table containing a randomly selected subset of the rows in an existing table or view.

50. The article of claim 49, wherein the Data Sampling function selects one or more data samples of specified sizes from a table.

51. The article of claim 20, wherein the scalable data mining functions comprise a Data Partitioning function that provides an ability to construct a new table containing at least one randomly selected subset of the rows in an existing table or view, wherein the subsets are mutually distinct but all-inclusive subsets of data.

52. The article of claim 51, wherein the Data Partitioning function selects one or more data partitions from a table using a database internal hashing technique.

53. The article of claim 20, wherein results of the data mining operations are stored in the relational database.

54. The article of claim 20, wherein the relational database management system further comprises an analytical logical data model that stores metadata and processing results from the Scalable Data Mining Functions.

* * * * *